(12) United States Patent
Pan et al.

(10) Patent No.: US 10,782,600 B2
(45) Date of Patent: Sep. 22, 2020

(54) PROJECTOR AND LIGHT SOURCE MODULE

(71) Applicant: Coretronic Corporation, Hsin-Chu (TW)

(72) Inventors: Haw-Woei Pan, Hsin-Chu (TW); Yao-Shun Lin, Hsin-Chu (TW); Jo-Han Hsu, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/391,311

(22) Filed: Apr. 23, 2019

(65) Prior Publication Data

US 2019/0339602 A1    Nov. 7, 2019

(30) Foreign Application Priority Data

May 2, 2018 (CN) .................. 2018 2 0638521 U

(51) Int. Cl.
*G03B 21/20* (2006.01)
*G03B 21/00* (2006.01)

(52) U.S. Cl.
CPC ....... *G03B 21/2013* (2013.01); *G03B 21/005* (2013.01); *G03B 21/2033* (2013.01); *G03B 21/2066* (2013.01)

(58) Field of Classification Search
CPC .... G03B 21/005; G03B 21/28; G03B 21/208; G03B 21/2013; G03B 21/2033; G03B 21/2053; G03B 21/2066
See application file for complete search history.

(56) References Cited

U.S. PATENT DOCUMENTS

2006/0146297 A1* 7/2006 Lee ................. H04N 5/7458
353/99
2010/0302514 A1* 12/2010 Silverstein ......... G02B 27/1026
353/37
(Continued)

FOREIGN PATENT DOCUMENTS

CN       204832751       12/2015
CN       205301795        6/2016
(Continued)

*Primary Examiner* — Sultan Chowdhury
(74) *Attorney, Agent, or Firm* — JCIPRNET

(57) ABSTRACT

A light source module includes a plurality of light combining elements, a plurality of first light emitting elements, and a plurality of second light emitting elements. Each of the light combining elements has a first reflecting surface and a second reflecting surface. Each of the first light emitting elements emits a first illuminating beam, and one of the first reflecting surfaces reflects the first illuminating beam to be transmitted along a light combining direction. Orthographic projections of the light combining elements on a reference plane are connected in sequence, and the reference plane is perpendicular to the light combining direction. Each of the second light emitting elements emits a second illuminating beam, and one of the second reflecting surfaces reflects the second illuminating beam to be transmitted along the light combining direction. In addition, a projector having the light source module is also provided.

22 Claims, 5 Drawing Sheets

(56) References Cited

U.S. PATENT DOCUMENTS

| | | | |
|---|---|---|---|
| 2011/0058146 A1* | 3/2011 | Lin | H04N 9/3173 353/81 |
| 2012/0133903 A1* | 5/2012 | Tanaka | G03B 21/2013 353/31 |
| 2016/0165194 A1* | 6/2016 | Hartwig | G02B 26/008 353/31 |
| 2017/0351167 A1 | 12/2017 | Wu et al. | |
| 2018/0188640 A1* | 7/2018 | Huang | G03B 33/08 |

FOREIGN PATENT DOCUMENTS

| | | |
|---|---|---|
| EP | 2592472 | 5/2013 |
| JP | 2012181260 | 9/2012 |
| TW | 201348847 | 12/2013 |

\* cited by examiner

PROJECTOR AND LIGHT SOURCE MODULE

CROSS-REFERENCE TO RELATED APPLICATION

This application claims the priority benefit of China application serial no. 201820638521.3, filed on May 2, 2018. The entirety of the above-mentioned patent application is hereby incorporated by reference herein and made a part of this specification.

BACKGROUND

Technical Field

The invention relates to an optical device and a component thereof, and particularly relates to a projector and a light source module.

Description of Related Art

A projector is a display device adapted to generate a large-sized frame. According to the imaging principle of the projector, an illuminating beam generated by a light source is converted into an image beam by using a light valve. Afterwards, the image beam is projected onto a screen or a wall by means of a projection lens.

Generally speaking, a light source module in the projector includes a plurality of sets of light source devices, and the light beams emitted by the light source devices are combined together by a light combining structure. As projection technology advances, users' demand for projectors with high brightness is also increasing, which results in corresponding increase of the number of the light source devices in the projector. Therefore, an important issue in the design of light source modules is how to reduce the overall size of the light source device and the light combining structure in a limited layout space while maintaining good light emission efficiency of the light source module.

The information disclosed in this "Description of Related Art" section is only for enhancement of understanding of the background of the invention, and therefore it may contain information that does not form the prior art that is already known to a person ordinarily skilled in the art. Furthermore, the information disclosed in this "Description of Related Art" section does not mean that one or more problems to be resolved by one or more embodiments of the invention were acknowledged by a person ordinarily skilled in the art.

SUMMARY

The invention provides a projector and a light source module that may be used to save layout space.

Other objectives and advantages of the invention may be further understood by referring to the technical features broadly embodied and described as follows.

In view of one, a part of, or all of the aforementioned or other objectives, an embodiment of the invention provides a projector that includes a light source module, a light valve and a projection lens. The light source module includes a plurality of light combining elements, a plurality of first light emitting elements, and a plurality of second light emitting elements. Each of the plurality of light combining elements has a first reflecting surface and a second reflecting surface that are not parallel to each other. The plurality of first light emitting elements are disposed at a first side of the plurality of light combining elements and are respectively aligned to the first reflecting surfaces. Each of the plurality of first light emitting elements is adapted to emit a first illuminating beam towards a first reflecting surface. The first reflecting surface is adapted to reflect the first illuminating beam so that the first illuminating beam is transmitted along a light combining direction. Orthographic projections of the plurality of light combining elements on a reference plane are connected in sequence, and the reference plane is perpendicular to the light combining direction. The plurality of second light emitting elements are disposed at a second side of the plurality of light combining elements and are respectively aligned to the second reflecting surfaces. Each of the plurality of second light emitting elements is adapted to emit a second illuminating beam towards a second reflecting surface. The second reflecting surface is adapted to reflect the second illuminating beam so that the second illuminating beam is transmitted along the light combining direction. The light valve is located on a transmission path of the first illuminating beams and the second illuminating beams coming from the light source module, and is adapted to convert the first illuminating beams and the second illuminating beams coming from the light source module into an image beam. The projection lens is disposed on a transmission path of the image beam.

In view of one, a part of, or all of the aforementioned or other objectives, an embodiment of the invention provides a light source module that includes a plurality of light combining elements, a plurality of first light emitting elements, and a plurality of second light emitting elements. Each of the plurality of light combining elements has a first reflecting surface and a second reflecting surface that are not parallel to each other. The plurality of first light emitting elements are disposed at a first side of the plurality of light combining elements and are respectively aligned to the first reflecting surfaces. Each of the plurality of first light emitting elements is adapted to emit a first illuminating beam towards a first reflecting surface. The first reflecting surface is adapted to reflect the first illuminating beam so that the first illuminating beam is transmitted along a light combining direction. Orthographic projections of the plurality of light combining elements on a reference plane are connected in sequence, and the reference plane is perpendicular to the light combining direction. The plurality of second light emitting elements are disposed at a second side of the plurality of light combining elements and are respectively aligned to the second reflecting surfaces. Each of the plurality of second light emitting elements is adapted to emit a second illuminating beam towards a second reflecting surface. The second reflecting surface is adapted to reflect the second illuminating beam so that the second illuminating beam is transmitted along the light combining direction.

Based on the foregoing, the embodiments of the invention achieve at least one of the following advantages or effects. The first light emitting elements and the second light emitting elements are respectively disposed at different sides of the light combining elements, and the first illuminating beams emitted by the first light emitting elements and the second illuminating beams emitted by the second light emitting elements are combined together by the light combining elements. Since the first light emitting elements and the second light emitting elements are not disposed at the same side, they may be avoided from being stacked with each other so that an excessively increase in the size of the light source module is avoided. Besides, orthographic projections of the light combining elements on the reference plane perpendicular to the light combining direction are connected in sequence so that no gap exists between these orthographic projections. That is, the light combining elements are closely arranged in the direction perpendicular to the light combining direction, so that the size of the light source module may be further reduced.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
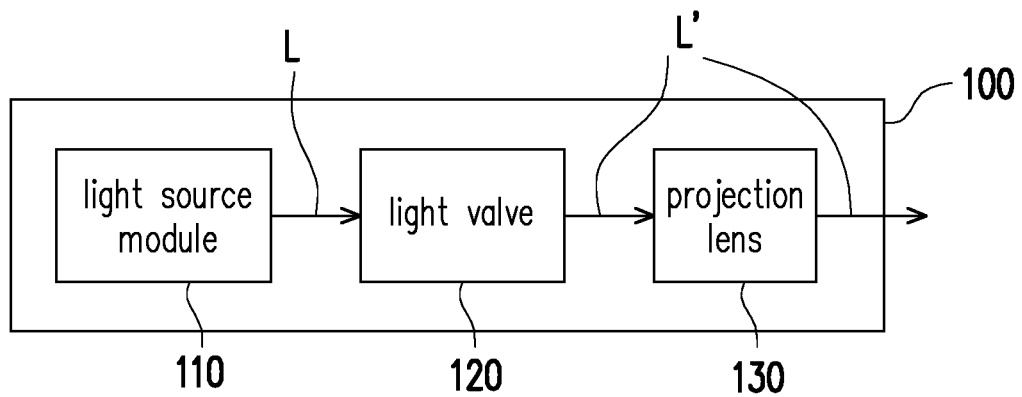
FIG. 1 is a schematic view of a projector according to an embodiment of this invention.

FIG. 1 is a schematic view of a projector according to an embodiment of this invention. With reference to FIG. 1, in this embodiment, a projector 100 includes a light source module 110, a light valve 120 and a projection lens 130. The light source module 110 is adapted to emit an illuminating beam L. The light valve 120 is located on a transmission path of the illuminating beam L and is adapted to convert the illuminating beam L into an image beam L'. In this embodiment, the light valve 120 may be a digital micro-mirror device (DMD), a liquid crystal on silicon (LCoS) substrate or a liquid crystal display (LCD) substrate. However, the invention is not limited thereto. The projection lens 130 is located on a transmission path of the image beam L' and is adapted to project the image beam L' outside the projector 100.

Figure 2:
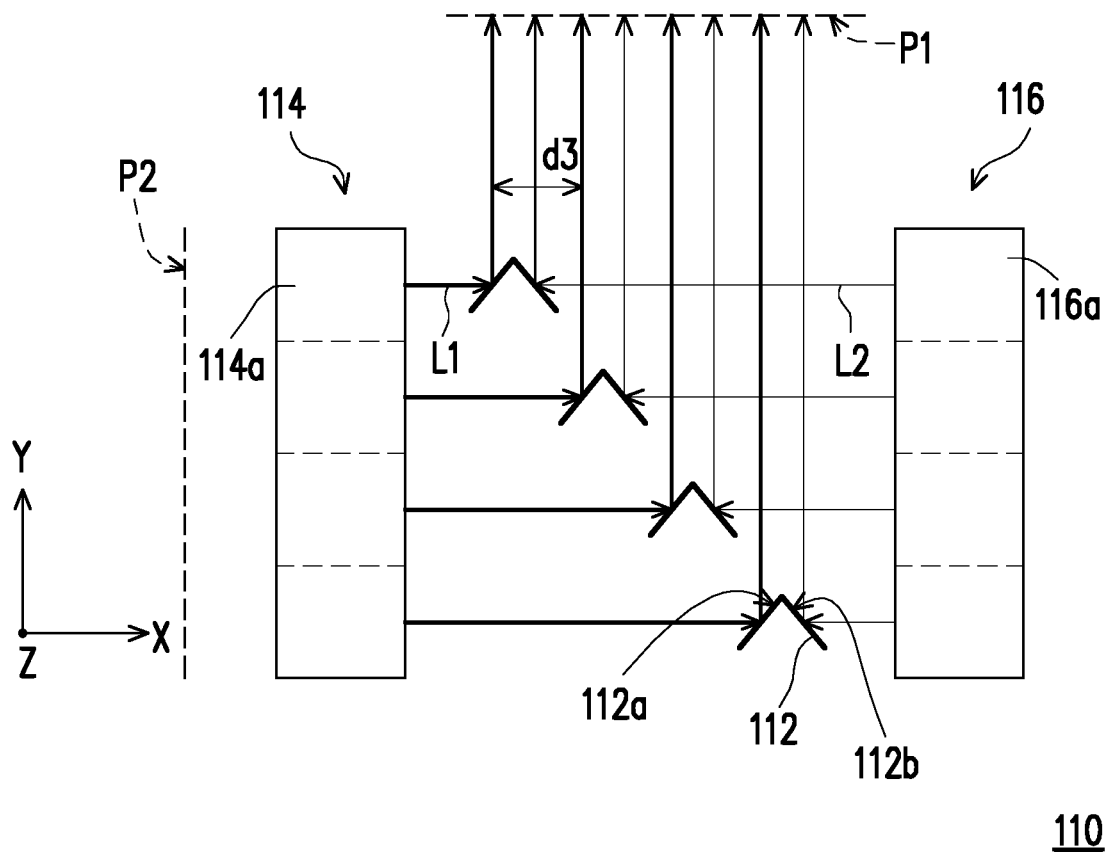
FIG. 2 is a schematic top view of the light source module of FIG. 1.

FIG. 2 is a schematic top view of the light source module of FIG. 1. With reference to FIG. 2, in this embodiment, the light source module 110 includes a plurality of light combining elements 112, a first light source device 114 and a second light source device 116. The first light source device 114 includes a plurality of first light emitting elements 114a, and the second light source device 116 includes a plurality of second light emitting elements 116a. The first light emitting elements 114a and the second light emitting elements 116a are, for example, laser diodes (LD) or light emitting diodes (LED). However, the invention is not limited thereto. Each of the light combining elements 112 has a first reflecting surface 112a and a second reflecting surface 112b that are not parallel to each other. Orthographic projections of the first reflecting surfaces 112a and the second reflecting surfaces 112b are alternatively arranged on a reference plane P1 that is perpendicular to a light combining direction Y and is parallel to a direction X and a direction Z. The first light source device 114 and the first light emitting elements 114a thereof are disposed at a first side of the light combining elements 112 (e.g., the left side in FIG. 2, to be described in detail later) and are respectively aligned to (located corresponding to) the first reflecting surfaces 112a. The second light source device 116 and the second light emitting elements 116a thereof are disposed at a second side of the light combining elements 112 (e.g., the right side in FIG. 2, to be described in detail later) and are respectively aligned to the second reflecting surfaces 112b.

The first side (e.g., the left side in FIG. 2) and the second side (e.g., the right side in FIG. 2) are, for example, two opposite sides of the light combining elements 112. An optical axis of a first illuminating beam L1 emitted by each of the first light emitting elements 114a towards a first reflecting surface 112a may be, for example, overlapped with an optical axis of a second illuminating beam L2 emitted by the corresponding second light emitting element 116a towards a second reflecting surface 112b. Besides, in this embodiment, the second illuminating beam L2 does not pass through the first reflecting surface 112a, and the first illuminating beam L1 does not pass through the second reflecting surface 112b. That is, the second reflecting surface 112b is located outside a transmission path of the first illuminating beam L1, and the first reflecting surface 112a is located outside a transmission path of the second illuminating beam L2.

Each of the first reflecting surfaces 112a is adapted to reflect a corresponding first illuminating beam L1 so that the corresponding first illuminating beam L1 is transmitted along the light combining direction Y. Similarly, each of the second reflecting surfaces 112b is adapted to reflect a corresponding second illuminating beam L2 so that the corresponding second illuminating beam L2 is transmitted along the light combining direction Y. In this embodiment, the first illuminating beams L1 and the second illuminating beams L2 transmitted along the light combining direction Y constitute the illuminating beam L as shown in FIG. 1.

In the configuration described above, since the first light emitting elements 114a and the second light emitting elements 116a are respectively disposed at different sides of the light combining elements 112 instead of being disposed at the same side, the first light emitting elements 114a and the second light emitting elements 116a may be avoided from being stacked with each other so that an excessively increase in the size of the light source module 110 is avoided. Besides, in this embodiment, orthographic projections of the light combining elements 112 on the reference plane P1 are connected in sequence so that no gap exists between these orthographic projections. That is, the light combining elements 112 are closely arranged in the direction X perpendicular to the light combining direction Y, so that the size of the light source module 110 may be further reduced.

As shown in FIG. 2, in this embodiment, orthographic projections of the first light emitting elements 114a on another reference plane P2, which is perpendicular to a light exit direction of the first light emitting elements 114a, do not overlap with each other. Orthographic projections of the second light emitting elements 116a on the reference plane P2 do not overlap with each other. Orthographic projections of the light combining elements 112 on the reference plane P2 do not overlap with each other. As a result, each of the first light emitting elements 114a and each of the second light emitting elements 116a may be aligned to a corresponding light combining element 112. Besides, the orthographic projections of the light combining elements 112 on the reference plane P1 do not overlap with each other, so that the first illuminating beam L1 and the second illuminating beam L2 that are reflected by each of the light combining elements 112 are not blocked by other light combining elements 112.

Figure 3:
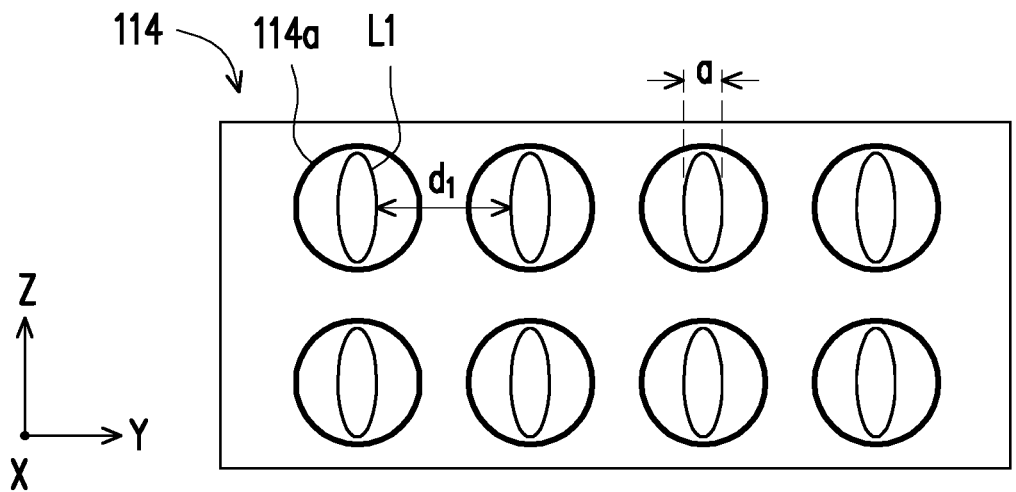
FIG. 3 is a side view of the first light source device of FIG. 2.
Figure 4:
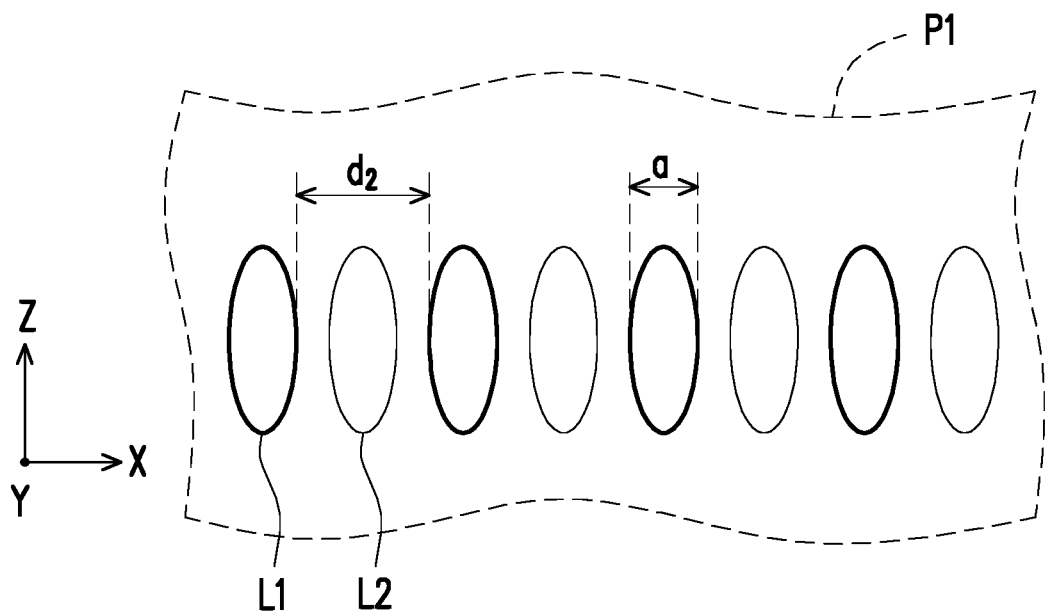
FIG. 4 illustrates the first illuminating beams and the second illuminating beams on the reference plane P1 as shown in FIG. 2.

FIG. 3 is a side view of the first light source device of FIG. 2. FIG. 4 illustrates the first illuminating beams and the second illuminating beams on the reference plane P1 as shown in FIG. 2. In this embodiment, two adjacent first illuminating beams L1 have a first interval d1 therebetween (as shown in FIG. 3) before being reflected by two corresponding first reflecting surfaces 112a and have a second interval d2 therebetween (as shown in FIG. 4) after being reflected by the two corresponding first reflecting surfaces 112a. The second interval d2 is smaller than the first interval d1. That is, the plurality of first illuminating beams L1 have higher density after being reflected by the plurality of first reflecting surfaces 112a. Similarly, the side view of the second light source device 116 is similar to the side view of the first light source device 114 as shown in FIG. 3, so repeated illustration is omitted here. Besides, the second illuminating beam L2 has characteristics similar to the aforementioned characteristics of the first illuminating beam L1. That is, a second interval d2 (i.e., an interval between two adjacent second illuminating beams L2 after they are reflected by two corresponding second reflecting surfaces 112b) is smaller than a first interval d1 (i.e., an interval between the two adjacent second illuminating beams L2 before they are reflected by the two corresponding second reflecting surfaces 112b), and detailed description is not repeated hereinafter.

More specifically, in this embodiment, in the direction X perpendicular to the light combining direction Y, the distance between two optical axes of the two first illuminating beams L1 after the two first illuminating beams L1 are reflected by the two adjacent first reflecting surfaces 112a is a third interval d3 (as shown in FIG. 2). Each third interval d3 is equal to the sum of a corresponding second interval d2 (as shown in FIG. 4) and a width a of the corresponding first illuminating beam L1 (as shown in FIG. 3 and FIG. 4). The width a, for example, corresponds to the minor axis of an elliptical light spot formed by the first illuminating beam L1, and the optical axis of the first illuminating beam L1 is perpendicular to the minor axis and the major axis of the elliptical light spot. Similarly, the second illuminating beam L2 has characteristics similar to the aforementioned characteristics of the first illuminating beam L1. That is, a third interval d3 (i.e., the distance between two optical axes of the two second illuminating beams L2 after the two second illuminating beams L2 are reflected by the two adjacent second reflecting surfaces 112b) is equal to the sum of the second interval d2 and the width a (i.e., the width of the corresponding second illuminating beam L2), and detailed description is not repeated hereinafter.

Figure 5:
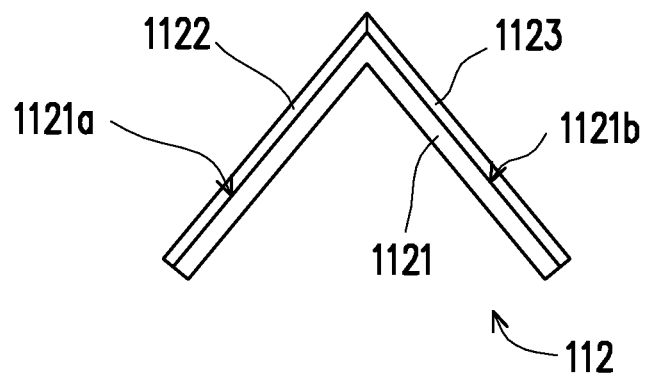
FIG. 5 is an enlarged view of the light combining element of FIG. 2.

FIG. 5 is an enlarged view of the light combining element of FIG. 2. With reference to FIG. 5, in this embodiment, each of the light combining elements 112 includes a body 1121, a first reflecting layer 1122 and a second reflecting layer 1123. Each of the bodies 1121 has a first surface 1121a and a second surface 1121b that are not parallel to each other. The first reflecting layer 1122 is disposed on the first surface 1121a to form the first reflecting surface 112a (as shown in FIG. 2). The second reflecting layer 1123 is disposed on the second surface 1121b to form the second reflecting surface 112b (as shown in FIG. 2).

Figure 6:
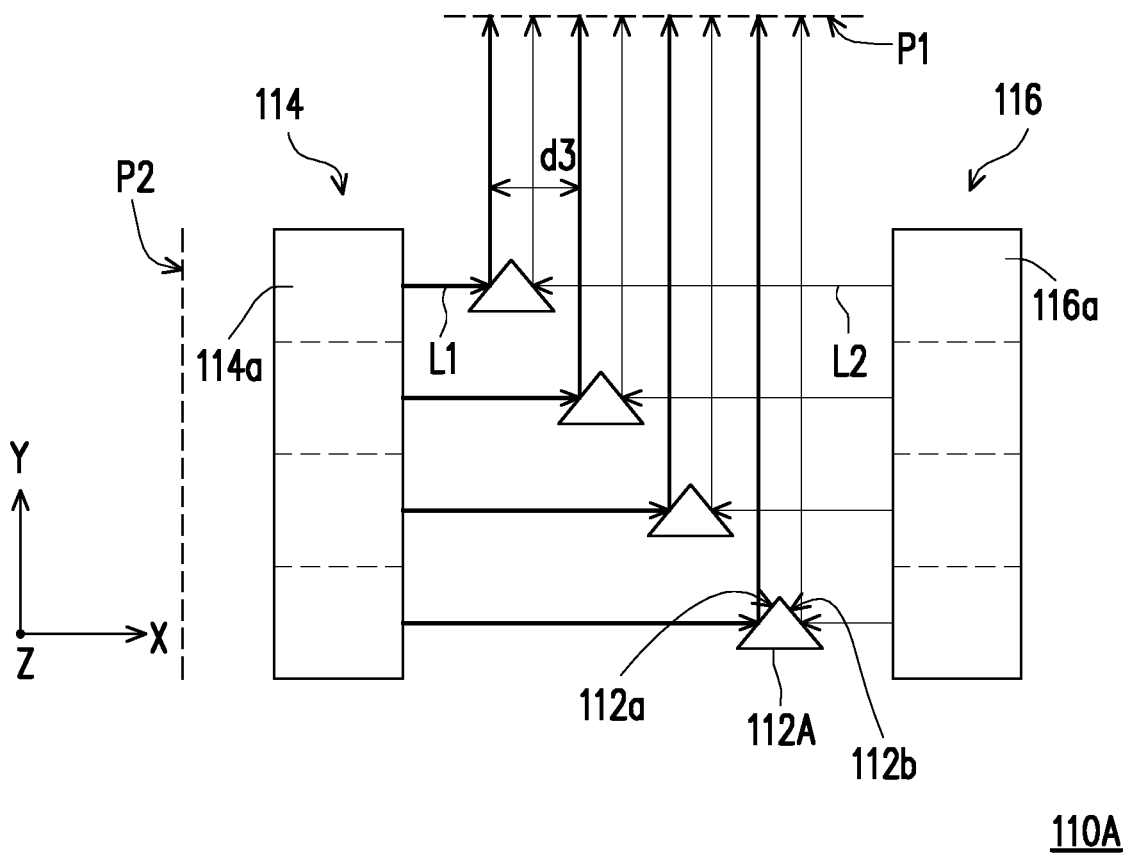
FIG. 6 is a schematic top view of a light source module according to another embodiment of the invention.

The invention does not impose limitations on the type of the light combining element, an example of which is provided below for illustration. FIG. 6 is a schematic top view of a light source module according to another embodiment of the invention. Differences between a light source module 110A shown in FIG. 6 and the light source module 110 shown in FIG. 2 primarily lie in that each light combining element 112A of the light source module 110A is a light transmitting element (such as a prism), and each first reflecting surface 112a and a corresponding second reflecting surface 112b are formed on a corresponding light transmitting element.

Figure 7:
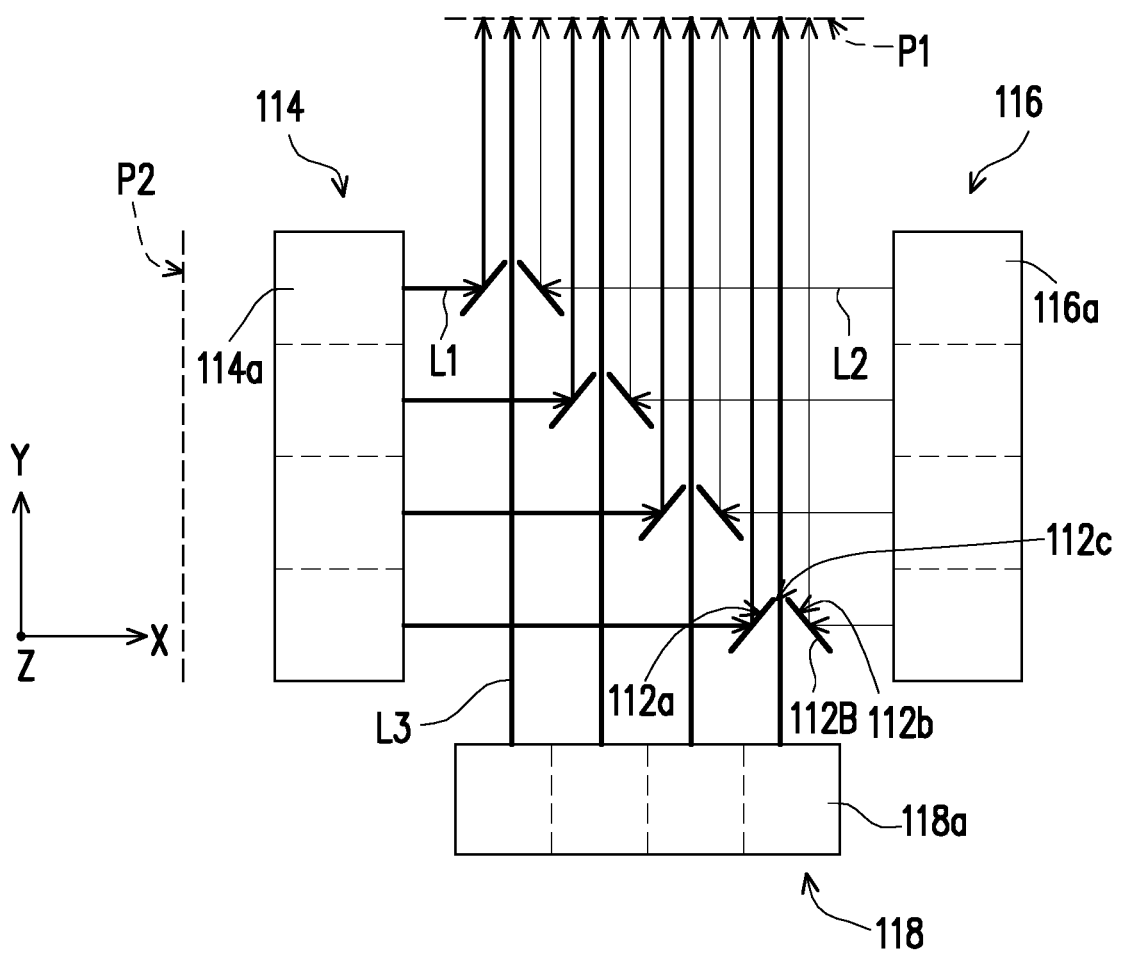
FIG. 7 is a schematic top view of a light source module according to another embodiment of the invention.

FIG. 7 is a schematic top view of a light source module according to another embodiment of the invention. Differences between a light source module 110B shown in FIG. 7 and the light source module 110 shown in FIG. 2 primarily lie in that the light source module 110B further includes a third light source device 118, and the third light source device 118 includes a plurality of third light emitting elements 118a. The third light emitting elements 118a are disposed at a third side of light combining elements 112B (e.g., the bottom side in FIG. 7, to be described in detail later) and are respectively aligned to the light combining elements 112B. Each third light emitting element 118a is adapted to emit a third illuminating beam L3 towards the corresponding light combining element 112B along a light combining direction Y. Each third illuminating beam L3 is adapted to pass through a corresponding light combining element 112B along the light combining direction Y. In this embodiment, a first illuminating beam L1, a second illuminating beam L2 and the third illuminating beam L3 constitute the illuminating beam L as shown in FIG. 1. Specifically, in this embodiment, each light combining element 112B has an opening 112c. Each opening 112c is located between a corresponding first reflecting surface 112a and a corresponding second reflecting surface 112b to separate the first reflecting surface 112a from the second reflecting surface 112b. Each third illuminating beam L3 passes through the opening 112c of a corresponding light combining element 112B. In this embodiment, the aforementioned third side (e.g., the bottom side in FIG. 7) is, for example, located between the first side (e.g., the left side in FIG. 7) and the second side (e.g., the right side in FIG. 7). Herein the first side (e.g., the left side in FIG. 7) and the second side (e.g., the right side in FIG. 7) are, for example, two opposite sides of the light combining elements 112B.

Figure 8:
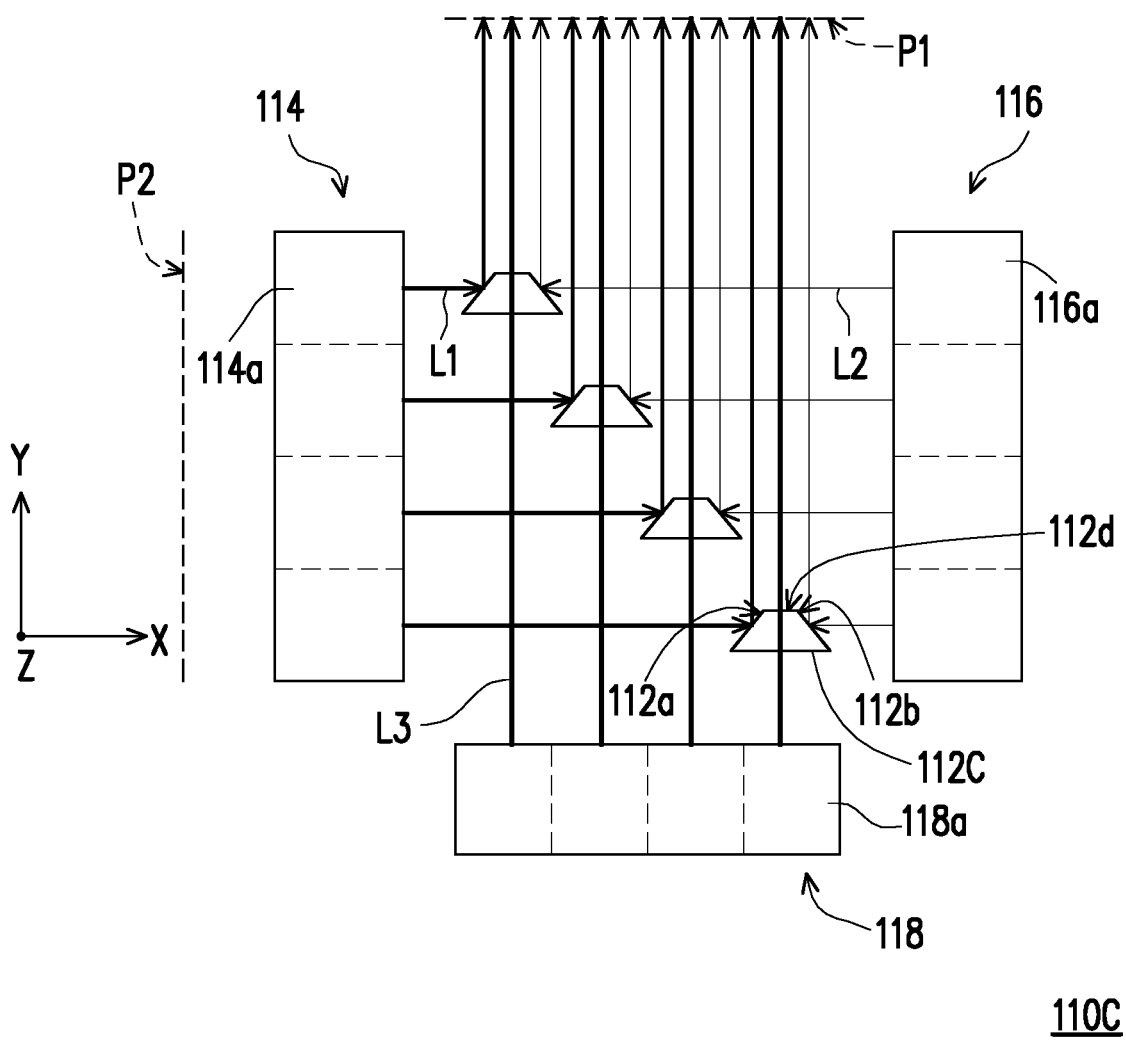
FIG. 8 is a schematic top view of a light source module according to another embodiment of the invention.

FIG. 8 is a schematic top view of a light source module according to another embodiment of the invention. Differences between a light source module 110C shown in FIG. 8 and the light source module 110B shown in FIG. 7 primarily lie in that each light combining element 112C is a light transmitting element (such as a prism) and has a light emitting surface 112d, each light emitting surface 112d is located/connected between a corresponding first reflecting surface 112a and a corresponding second reflecting surface 112b, and each third illuminating beam L3 passes through the light emitting surface 112d of the light combining element 112C.

In conclusion of the above, the embodiments of the invention achieve at least one of the following advantages or effects. The first light emitting elements and the second light emitting elements are respectively disposed at different sides of the light combining elements, and the first illuminating beams emitted by the first light emitting elements and the second illuminating beams emitted by the second light emitting elements are combined together by the light combining elements. Since the first light emitting elements and the second light emitting elements are not disposed at the same side, they may be avoided from being stacked with each other so that an excessively increase in the size of the light source module is avoided. Besides, orthographic projections of the light combining elements on the reference plane perpendicular to the light combining direction are connected in sequence so that no gap exists between these orthographic projections. That is, the light combining elements are closely arranged in the direction perpendicular to the light combining direction, so that the size of the light source module may be further reduced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projector, comprising:
    a light source module, comprising: a plurality of light combining elements, a plurality of first light emitting elements, and a plurality of second light emitting elements, wherein each of the plurality of light combining elements has a first reflecting surface and a second reflecting surface that are not parallel to each other;
    the plurality of first light emitting elements are disposed at a first side of the plurality of light combining elements and are respectively aligned to the first reflecting surfaces, wherein each of the plurality of first light emitting elements is adapted to emit a first illuminating beam towards one of the first reflecting surfaces, and the one of the first reflecting surfaces is adapted to reflect the first illuminating beam so that the first illuminating beam is transmitted along a light combining direction, orthographic projections of the plurality of light combining elements on a reference plane are connected in sequence, and the reference plane is perpendicular to the light combining direction; and
    the plurality of second light emitting elements are disposed at a second side of the plurality of light combining elements and are respectively aligned to the second reflecting surfaces, wherein each of the plurality of second light emitting elements is adapted to emit a second illuminating beam towards one of the second reflecting surfaces, and the one of the second reflecting surfaces is adapted to reflect the second illuminating beam so that the second illuminating beam is transmitted along the light combining direction;
    a light valve, located on a transmission path of the first illuminating beams and the second illuminating beams coming from the light source module, and adapted to convert the first illuminating beams and the second illuminating beams coming from the light source module into an image beam; and a projection lens, located on a transmission path of the image beam, wherein orthographic projections of the first reflecting surfaces and the second reflecting surfaces are alternately arranged on the reference plane along a direction parallel to a light exit direction of the first light emitting elements.

2. The projector of claim 1, wherein adjacent two of the first illuminating beams have a first interval therebetween before being reflected by two of the first reflecting surfaces and have a second interval therebetween after being reflected by the two of the first reflecting surfaces, and each of the second intervals is smaller than each of the first intervals.

3. The projector of claim 2, wherein in a direction perpendicular to the light combining direction, a distance between two optical axes of the adjacent two of the first illuminating beams after the adjacent two of the first illuminating beams are reflected by the two of the first reflecting surfaces adjacent to each other is a third interval, and each of the third intervals is equal to a sum of one of the second intervals and a width of one of the first illuminating beams.

4. The projector of claim 1, wherein an optical axis of the first illuminating beam emitted by each of the plurality of first light emitting elements towards the one of the first reflecting surfaces is overlapped with an optical axis of the second illuminating beam emitted by the second light emitting element towards the one of the second reflecting surfaces.

5. The projector of claim 1, wherein orthographic projections of the plurality of first light emitting elements on another reference plane do not overlap with each other, and the another reference plane is perpendicular to a light exit direction of one of the plurality of first light emitting elements.

6. The projector of claim 1, wherein orthographic projections of the plurality of light combining elements on the reference plane perpendicular to the light combining direction do not overlap with each other.

7. The projector of claim 1, wherein each of the plurality of light combining elements comprises a body, a first reflecting layer and a second reflecting layer, each of the bodies has a first surface and a second surface that are not parallel to each other, the first reflecting layers are respectively disposed on the first surfaces to form the first reflecting surfaces, and the second reflecting layers are respectively disposed on the second surfaces to form the second reflecting surfaces.

8. The projector of claim 1, wherein each of the plurality of light combining elements is a light transmitting element, and one of the first reflecting surfaces of the light transmitting element is formed on the light transmitting element and one of the second reflecting surfaces of the light transmitting element is formed on the light transmitting element.

9. The projector of claim 1, wherein the light source module comprises a plurality of third light emitting elements, the plurality of third light emitting elements are disposed at a third side of the plurality of light combining elements and are respectively aligned to the plurality of light combining elements, each of the plurality of third light emitting elements is adapted to emit a third illuminating beam towards one of the light combining elements along the light combining direction, and one of the third illuminating beams is adapted to pass through the one of the light combining elements along the light combining direction.

10. The projector of claim 9, wherein each of the plurality of light combining elements has an opening, the opening is located between the first reflecting surface and the second reflecting surface, and each of the third illuminating beams passes through the opening of the light combining element.

11. The projector of claim 9, wherein each of the plurality of light combining elements is a light transmitting element and has a light emitting surface, each of the light emitting surfaces is located between the first reflecting surface and the second reflecting surface, and each of the third illuminating beams passes through the light emitting surface of the light combining element.

12. A light source module, comprising:

a plurality of light combining elements, wherein each of the plurality of light combining elements has a first reflecting surface and a second reflecting surface that are not parallel to each other;

a plurality of first light emitting elements disposed at a first side of the plurality of light combining elements and respectively aligned to the first reflecting surfaces, wherein each of the plurality of first light emitting elements is adapted to emit a first illuminating beam towards one of the first reflecting surface, the one of the first reflecting surfaces is adapted to reflect the first illuminating beam so that the first illuminating beam is transmitted along a light combining direction, orthographic projections of the plurality of light combining elements on a reference plane are connected in sequence, and the reference plane is perpendicular to the light combining direction; and a plurality of second light emitting elements disposed at a second side of the plurality of light combining elements and respectively aligned to the second reflecting surfaces, wherein each of the plurality of second light emitting elements is adapted to emit a second illuminating beam towards one of the second reflecting surface, and each of the second reflecting surfaces is adapted to reflect the second illuminating beam so that the second illuminating beam is transmitted along the light combining direction, wherein orthographic projections of the first reflecting surfaces and the second reflecting surfaces are alternately arranged on the reference plane along a direction parallel to a light exit direction of the first light emitting elements.

13. The light source module of claim 12, wherein adjacent two of the first illuminating beams have a first interval therebetween before being reflected by two of the first reflecting surfaces and have a second interval therebetween after being reflected by the two of the first reflecting surfaces, and each of the second intervals is smaller than each of the first intervals.

14. The light source module of claim 13, wherein in a direction perpendicular to the light combining direction, a distance between two optical axes of the adjacent two of the first illuminating beams after the adjacent two of the first illuminating beams are reflected by the two of the first reflecting surfaces adjacent to each other is a third interval, and each of the third intervals is equal to a sum of one of the second intervals and a width of one of the first illuminating beams.

15. The light source module of claim 12, wherein an optical axis of the first illuminating beam emitted by each of the plurality of first light emitting elements towards the one of the first reflecting surfaces is overlapped with an optical axis of the second illuminating beam emitted by the second light emitting element towards the one of the second reflecting surface.

16. The light source module of claim 12, wherein orthographic projections of the plurality of first light emitting elements on another reference plane do not overlap with each other, and the another reference plane is perpendicular to a light exit direction of one of the plurality of first light emitting elements.

17. The light source module of claim 12, wherein orthographic projections of the plurality of light combining elements on the reference plane perpendicular to the light combining direction do not overlap with each other.

18. The light source module of claim 12, wherein each of the plurality of light combining elements comprises a body, a first reflecting layer and a second reflecting layer, each of the bodies has a first surface and a second surface that are not parallel to each other, the first reflecting layers are respectively disposed on the first surfaces to form the first reflecting surfaces, and the second reflecting layers are respectively disposed on the second surfaces to form the second reflecting surfaces.

19. The light source module of claim 12, wherein each of the plurality of light combining elements is a light transmitting element, and one of the first reflecting surfaces of the light transmitting element is formed on the light transmitting element and one of the second reflecting surface of the light transmitting element is formed on the light transmitting element.

20. The light source module of claim 12, wherein the light source module comprises a plurality of third light emitting elements, wherein the plurality of third light emitting elements are disposed at a third side of the plurality of light combining elements and are respectively aligned to the plurality of light combining elements, each of the plurality of third light emitting elements is adapted to emit a third illuminating beam towards one of the light combining elements along the light combining direction, and one of the third illuminating beams is adapted to pass through the one of light combining elements along the light combining direction.

21. The light source module of claim 20, wherein each of the plurality of light combining elements has an opening, the opening is located between the first reflecting surface and the second reflecting surface, and each of the third illuminating beams passes through the opening of the light combining element.

22. The light source module of claim 20, wherein each of the plurality of light combining elements is a light transmitting element and has a light emitting surface, each of the light emitting surfaces is located between the first reflecting surface and the second reflecting surface, and each of the third illuminating beams passes through the light emitting surface of the light combining element.

* * * * *